United States Patent
Li et al.

(10) Patent No.: US 11,288,477 B2
(45) Date of Patent: Mar. 29, 2022

(54) METHOD AND SYSTEM FOR IMAGING FINGERPRINT UNDER SCREEN, AND SCREEN

(71) Applicant: BOE Technology Group Co., Ltd., Beijing (CN)

(72) Inventors: Yapeng Li, Beijing (CN); Haisheng Wang, Beijing (CN); Xiaoliang Ding, Beijing (CN); Xueyou Cao, Beijing (CN); Yangbing Li, Beijing (CN); Yuanyuan Ma, Beijing (CN); Wenjuan Wang, Beijing (CN); Jiabin Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/156,695

(22) Filed: Jan. 25, 2021

(65) Prior Publication Data
US 2021/0279439 A1 Sep. 9, 2021

(30) Foreign Application Priority Data
Mar. 3, 2020 (CN) .......................... 202010140391.2

(51) Int. Cl.
*G06K 9/00* (2006.01)
*G06F 3/042* (2006.01)

(52) U.S. Cl.
CPC ....... *G06K 9/00013* (2013.01); *G06F 3/0421* (2013.01)

(58) Field of Classification Search
CPC ............. G06K 9/00013; G06K 9/0004; G06K 9/0002; G06F 3/0421; G06F 3/0412
See application file for complete search history.

(56) References Cited

U.S. PATENT DOCUMENTS

| | | | |
|---|---|---|---|
| 2014/0267659 A1* | 9/2014 | Lyon | G06K 9/03 348/77 |
| 2016/0266695 A1* | 9/2016 | Bae | G06F 3/04166 |
| 2018/0074627 A1* | 3/2018 | Kong | G06K 9/00013 |
| 2020/0019745 A1* | 1/2020 | Kang | G06K 9/00912 |
| 2020/0219447 A1* | 7/2020 | Talebzadeh | G09G 3/3258 |
| 2020/0380238 A1* | 12/2020 | Zeng | G06K 9/0004 |

* cited by examiner

*Primary Examiner* — Jonathan A Boyd
(74) *Attorney, Agent, or Firm* — Fay Sharpe LLP

(57) ABSTRACT

A method for imaging a fingerprint under a screen, including: acquiring a finger pressing area formed by a finger pressing on the screen; determining a first light source and a second light source of the screen based on the finger pressing area, wherein arrangement directions of the first light source and the second light source are not perpendicular to a long axis of the finger pressing area; acquiring a first fingerprint image after the first light source is turned on, and a second fingerprint image after the second light source is turned on; and splicing the first fingerprint image and the second fingerprint image to acquire a target fingerprint image.

18 Claims, 4 Drawing Sheets

METHOD AND SYSTEM FOR IMAGING FINGERPRINT UNDER SCREEN, AND SCREEN

The present disclosure claims priority to Chinese Patent Application No. 202010140391.2, filed on Mar. 3, 2020 and titled "METHOD AND SYSTEM FOR IMAGING FINGERPRINT UNDER SCREEN", which is incorporated herein by reference in its entirety.

TECHNICAL FIELD

The present disclosure relates to a method and system for imaging a fingerprint under a screen, and a screen.

BACKGROUND

A current optical fingerprint recognition technology realizes optical fingerprint recognition through a self-luminous screen. This technology abandons a light path structure, but uses a light-emitting unit in the screen as a light source to illuminate the finger, and uses an image acquiring assembly in the screen to acquire an image of the finger. In this way, a thickness of an entire imaging system is reduced while the cost of the imaging system is reduced.

SUMMARY

Embodiments of the present disclosure relate to a method and system for imaging a fingerprint under a screen, and a screen.

According to an aspect, a method for imaging a fingerprint under a screen is provided. The method includes:
acquiring a finger pressing area formed by a finger pressing on the screen;
determining a first light source and a second light source of the screen based on the finger pressing area, wherein arrangement directions of the first light source and the second light source are not perpendicular to a long axis of the finger pressing area;
acquiring a first fingerprint image after the first light source is turned on, and a second fingerprint image after the second light source is turned on; and
splicing the first fingerprint image and the second fingerprint image to acquire a target fingerprint image.

According to another aspect, a system for imaging a fingerprint under a screen is provided. The system includes:
a touch circuit configured to acquire a finger pressing area formed by a finger pressing on the screen;
a processor configured to determine a first light source and a second light source of the screen based on the finger pressing area, wherein arrangement directions of the first light source and the second light source are not perpendicular to a long axis of the finger pressing area;
an image acquisition circuit configured to acquire a first fingerprint image after the first light source is turned on, and a second fingerprint image after the second light source is turned on; and
the processor splices the first fingerprint image and the second fingerprint image to acquire a target fingerprint image.

According to yet another aspect, a screen is provided, the screen including a system for imaging a fingerprint under a screen. The system for imaging the fingerprint under the screen includes:
a touch circuit configured to acquire a finger pressing area formed by a finger pressing on the screen;
a processor configured to determine a first light source and a second light source of the screen based on the finger pressing area, wherein arrangement directions of the first light source and the second light source are not perpendicular to a long axis of the finger pressing area;
an image acquiring assembly configured to acquire a first fingerprint image after the first light source is turned on, and a second fingerprint image after the second light source is turned on; and
the processor splices the first fingerprint image and the second fingerprint image to acquire a target fingerprint image.

BRIEF DESCRIPTION OF THE DRAWINGS

After reading the detailed description of the non-restrictive embodiments made with reference to the following accompanying drawings, other features, objectives, and advantages of the present disclosure will become more apparent.

DETAILED DESCRIPTION

The present application will be further described in detail below with reference to the accompanying drawings and embodiments. It can be understood that the specific embodiments described here are only used to explain the related art, but not intended to limit the present disclosure. In addition, it should be noted that, for ease of description, only the parts related to the present disclosure are shown in the accompanying drawings.

It should be noted that the embodiments in the present disclosure and the features in the embodiments can be combined with each other if there is no conflict. The present disclosure will be described in detail below with reference to the accompanying drawings and in conjunction with the embodiments.

Owing to the breaking of the capacity barrier, the technical maturity, and the predictable cost reduction of organic light-emitting diodes (OLED), the optical scheme is becoming one of the important implementation modes of fingerprint recognition under a screen.

The current optical fingerprint recognition technologies include a technology implemented for a smart phone, which abandons a traditional optical fingerprint system and instead uses light emitted by a smart phone screen as a light source.

An optical fingerprint recognition technology includes a technology for imaging a fingerprint under a point light source screen, which uses the principle of total reflection for imaging. Due to the optical magnification, an image formed on a sensor layer is an upright magnified image.

Figure 1:
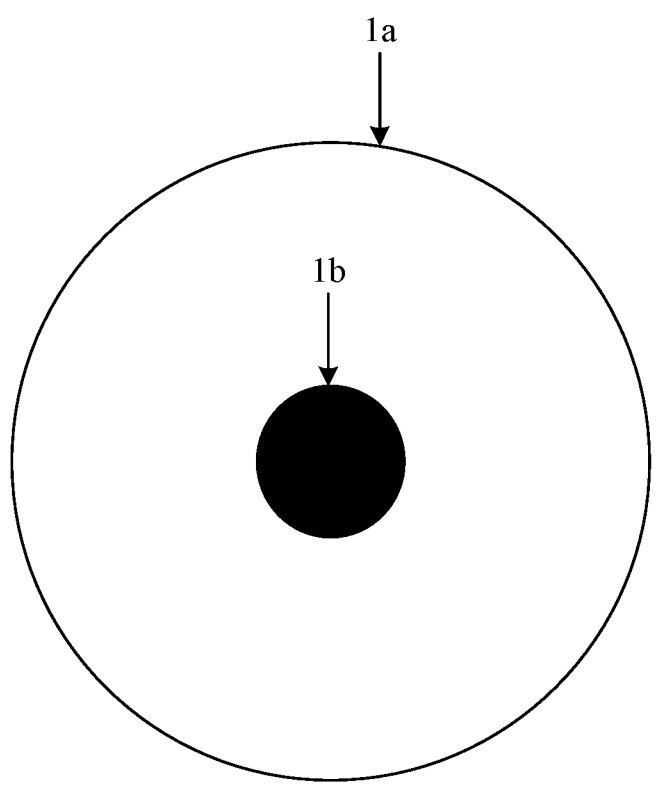
FIG. 1 is a schematic diagram of an imaging area of a single point light source in the present embodiment.

In addition, an incident angle of light emitted from a single point light source upward on the screen surface will be less than a total reflection angle, which makes it difficult to produce a total reflection. Therefore, there will be a circular invalid imaging area above the single point light source. FIG. 1 is a schematic diagram of an imaging area of a single point light source, in which a black circular area 1b is the invalid imaging area and is located in the middle of an entire imaging area 1a.

In the presence of the invalid imaging area 1b, two point light sources need to be turned on separately and images are acquired, and the acquired images are then spliced to acquire a fingerprint image with a large enough area. However, the fingerprint image (the fingerprint image may be approximated as an elliptical image) has a long axis (the long axis may refer to an axis in a direction along which the image is longer) and a short axis (the short axis may refer to an axis in a direction along which the image is shorter). At the same time, a contact area between the finger and the screen may also be considered as an elliptical area where the long axis and the short axis also exist. If the long axis direction of the fingerprint image is perpendicular to the long axis direction of the contact area, some ambient light will enter the sensor layer. As a result of the magnification of imaging, part of fingerprint information will be submerged, such that the fingerprint image actually contains less fingerprint information, thereby affecting the accuracy of fingerprint recognition.

Figure 2:
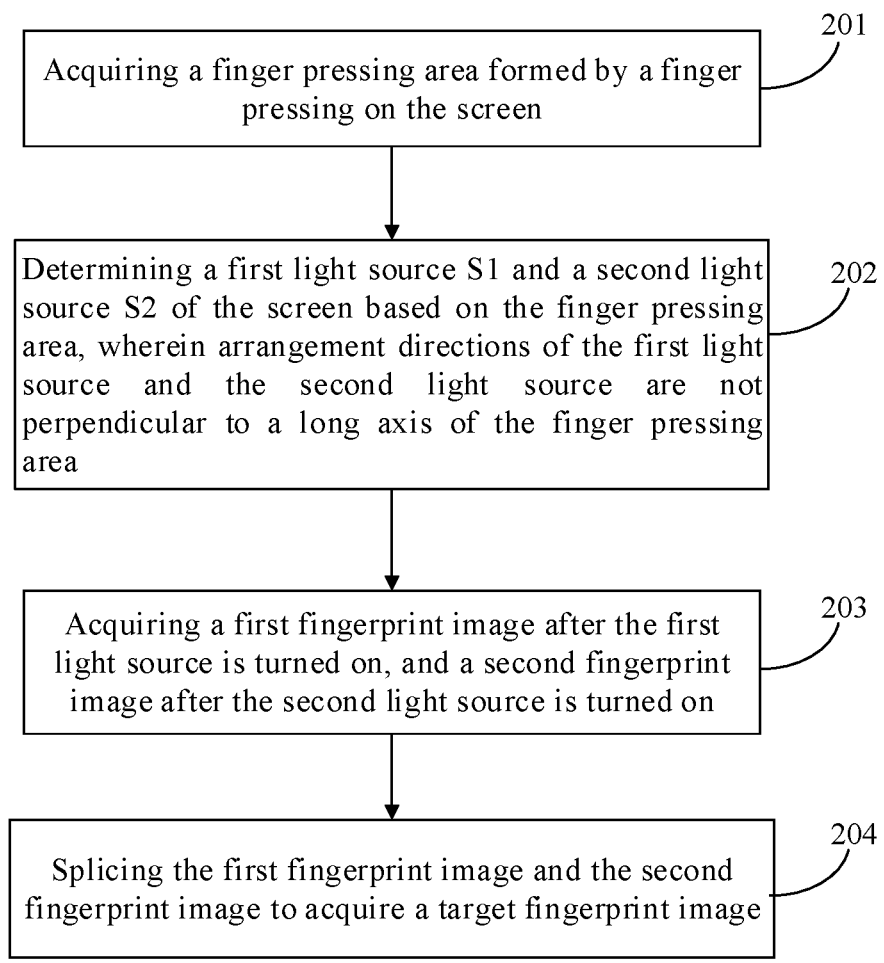
FIG. 2 is a flowchart of a method for imaging a fingerprint under a screen in the present embodiment.

Referring to FIG. 2, the present embodiment provides a method for imaging a fingerprint under a screen, which is applicable to a screen. The screen may include a touch screen, a display screen, and an image acquiring assembly, wherein the touch screen may include a touch circuit configured to determine touch points; and an image acquisition circuit in the image acquiring assembly includes a plurality of sensors configured to acquire fingerprint images. The method for imaging the fingerprint under the screen may include the following steps.

In 201, a finger pressing area formed by a finger pressing on the screen is acquired.

In 202, a first light source S1 and a second light source S2 of the screen are determined based on the finger pressing area, wherein arrangement directions of the first light source and the second light source are not perpendicular to a long axis of the finger pressing area.

In 203, a first fingerprint image after the first light source is turned on and a second fingerprint image after the second light source is turned on are acquired.

In 204, the first fingerprint image and the second fingerprint image are spliced to acquire a target fingerprint image.

In summary, in the present embodiment, the two light sources of which the arrangement direction is not perpendicular to the long axis of the finger pressing area are determined based on the finger pressing area, the fingerprint images are acquired respectively after the light sources are sequentially turned on, and the acquired fingerprint images are spliced to acquire the target fingerprint image. In this way, the fingerprint information in the acquired target fingerprint image can be increased, thereby improving the accuracy of fingerprint recognition.

Optionally, the step 201 includes:

acquiring a signal matrix composed of touch points pressed by the finger on the screen, wherein the signal matrix includes information on the finger pressing area.

Figure 3:
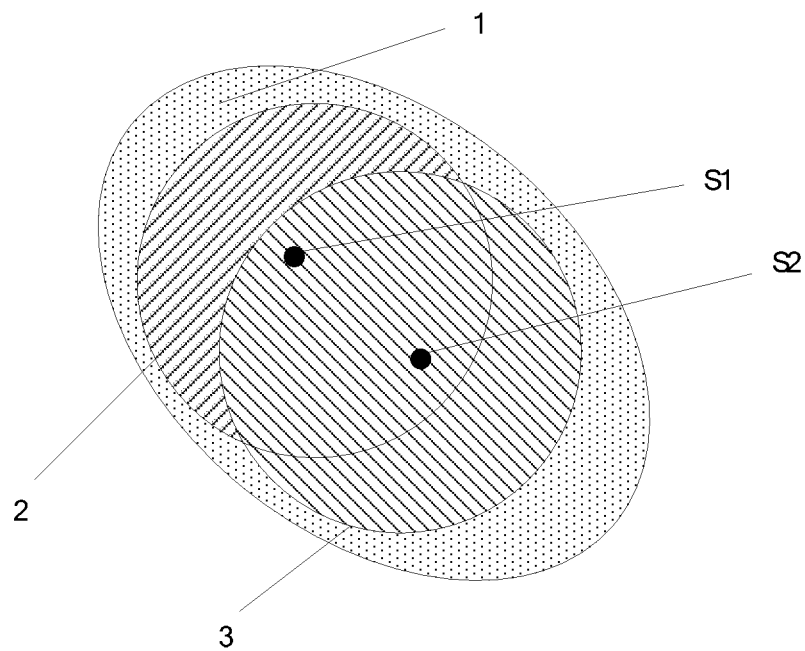
FIG. 3 is a schematic diagram of fingerprint imaging under the screen in the present embodiment.

In the present embodiment, the signal matrix pressed by the finger is acquired through the touch screen, and the positions of two light sources that need to turned on are calculated based on the signal matrix and other information. FIG. 3 is a schematic diagram of fingerprint imaging under the screen provided by an embodiment of the present disclosure. In FIG. 3, 1 represents the fingerprint pressing area, the two light sources that are turned on are the first light source S1 and the second light source S2, and ranges of the two light sources which are turned on are respectively a range 2 and a range 3, such that a sum of the ranges of the two light sources which are turned on can include the finger pressing area to the greatest extent. That is, the range 2 and the range 3 cover the area of the range 1 as much as possible, thereby making fingerprint recognition to be more accurate.

The light sources involved in the embodiments of the present disclosure, such as the first light source or the second light source, may be considered as point light sources. The first light source or the second light source may include one or more light-emitting units (such as organic light-emitting units) of the screen. For example, each light source may include 9×9 light-emitting units.

Optionally, the step 202 includes the following steps.

A center point P' of the finger pressing area and the long axis of the finger pressing area are acquired.

A reference point P corresponding to the center point P' of the finger pressing area in a fingerprint acquisition coordinate system, and a reference axis corresponding to the long axis of the finger pressing area in the fingerprint acquisition coordinate system are acquired, wherein the fingerprint acquisition coordinate system is a coordinate system where the fingerprint images are located, and the coordinate system may be established based on a plurality of sensors arranged in an array in the image acquisition circuit of the screen.

The first light source and the second light source located on both sides of the reference point on the reference axis are determined.

The two light sources are both located on the reference axis, which can increase the fingerprint information included in the target fingerprint image formed by splicing.

In the present embodiment, the signal matrix composed of a plurality of touch points is acquired first, and subsequent calculations are performed based on the signal matrix. First, the center point P' and the long axis of the finger pressing area are determined based on the information of the finger pressing area included in the signal matrix and the finger pressing area is formed by the finger pressing on the screen. Subsequently, the reference point P may be determined based on a coordinate relationship between coordinates of the sensors in the touch circuit (the coordinates may be considered as the coordinates in the touch coordinate system) and coordinates of the sensors in the image acquisition circuit of the screen (the coordinates may be considered as the coordinates in the fingerprint acquisition coordinate system).

The process of determining the signal matrix may include: acquiring a touch position of the finger by the touch circuit of the screen; then processing original data of the touch position, such as removing corresponding interferences; and subsequently, calculating a pressure point at each position in the original data, wherein the formed touch area data is the signal matrix.

Optionally, the above step "acquiring the center point P' and the long axis of the finger pressing area" may include:

determining a center of gravity of the signal matrix as the center point P' of the finger pressing area; and calculating the long axis of the finger pressing area based on a central moment of the signal matrix.

In the present embodiment, based on the signal matrix, a gravity center method is adopted to determine the center point and the long axis of the finger pressing area. The process may include the followings.

Assuming that the signal matrix acquired from a touch unit is T, which is a two-dimensional matrix of m*n, then the center P' is:

$$\begin{cases} \bar{x} = \dfrac{\sum\limits_{m,n} xT(x,y)}{\sum\limits_{m,n} T(x,y)} \\ \bar{y} = \dfrac{\sum\limits_{m,n} yT(x,y)}{\sum\limits_{m,n} T(x,y)} \end{cases},$$

wherein x and y are indexes of the signal matrix.

Then the second-order central moment of the signal matrix is configured to determine the long axis direction of the finger pressing area. The axis passing through the center of the finger pressing area and having a direction parallel to the long axis direction of the finger pressing area is the long axis of the finger pressing area.

The concept of a central moment is introduced, and a (p+q)-order central moment of the signal matrix T is:

$$M_{pq} = \sum_x \sum_y (x-\bar{x})^p (y-\bar{y})^q T(x,y),$$

wherein p and q are integers.

Then the long axis direction of the finger pressing area may be calculated by the following formula:

$$\theta_T = \dfrac{\arctan\left(\dfrac{2M_{11}}{M_{20}-M_{02}}\right)}{2}.$$

The long axis direction $\theta_T$ of the finger pressing area may refer to an angle with the x-axis in the touch coordinate system.

Optionally, the above step "acquiring the reference point P corresponding to the center point P' of the finger pressing area in the fingerprint acquisition coordinate system, and the reference axis corresponding to the long axis of the finger pressing area in the fingerprint acquisition coordinate system" may include:

determining the reference point P and the reference axis by a mapping relationship between the touch coordinate system and the fingerprint acquisition coordinate system, as well as the center point P' of the finger pressing area and the long axis of the finger pressing area, wherein the touch coordinate system is a coordinate system where the finger pressing area is located.

The process of determining the reference point P and the reference axis may include the followings.

Since the coordinates of the touch point (the coordinates may be the coordinates in the touch coordinate system) and the coordinates of the sensors in the image acquisition circuit (the coordinates are the coordinates in the fingerprint acquisition coordinate system) may be inconsistent, after the center point P' (the point P' is the coordinates of the touch point) of the finger pressing area is acquired, the coordinates on the corresponding fingerprint acquisition coordinate system may be acquired by coordinate mapping. In order to distinguish the coordinates in the touch coordinate system from those in the fingerprint acquisition coordinate system, $(T_x, T_y)$ is set as the coordinates in the touch coordinate system, and $(S_x, S_y)$ is set as the coordinates in the fingerprint acquisition coordinate system, then:

$$\begin{cases} T_x = \bar{x} \\ T_y = \bar{y} \end{cases}.$$

The conversion relationship between the coordinates $(T_x, T_y)$ in the touch coordinate system and the coordinates $(S_x, S_y)$ in the fingerprint acquisition coordinate system may be expressed by the following coordinate transformation:

$$\begin{cases} S_x = A_1 T_x + B_1 T_y + C_1 \\ S_y = A_2 T_x + B_2 T_y + C_2 \end{cases}.$$

$A_1$, $B_1$, $C_1$, $A_2$, $B_2$, $C_2$ are mapping coefficients, which may be acquired by calibration. The position corresponding to the center of the finger pressing area in the fingerprint acquisition coordinate system may be acquired by the above formula.

Due to the existence of the mapping relationship, the long axis direction $\theta_T$ of the finger pressing area acquired from the finger pressing area (the direction $\theta_T$ may refer to the angle with the x-axis in the touch coordinate system) and the direction $\theta_S$ of the corresponding reference axis in the fingerprint acquisition coordinate system (the direction $\theta_S$ may refer to the angle with the x-axis in the fingerprint acquisition coordinate system) are also inconsistent. Therefore, the following transformation may be performed: $\theta_S = \theta_T - \arctan(B_1/A_1)$.

Optionally, the positions of the first light source and the second light source are determined based on the above point P and the long axis direction $\theta_s$, wherein a distance between the first light source and the second light source is greater than or equal to 2R. The R is a radius of a circular invalid imaging area of the light sources of the screen on a contact surface between the finger and the screen.

A valid image imaged by the point light source is a ring, and the central circle area of the ring is considered to be incapable of imaging. Therefore, the first fingerprint image and the second fingerprint image respectively include the invalid imaging area therein. Therefore, the formed first fingerprint image at least includes the invalid imaging area in the second fingerprint image, and the second fingerprint image at least includes the invalid imaging area in the first fingerprint image.

Figure 4:
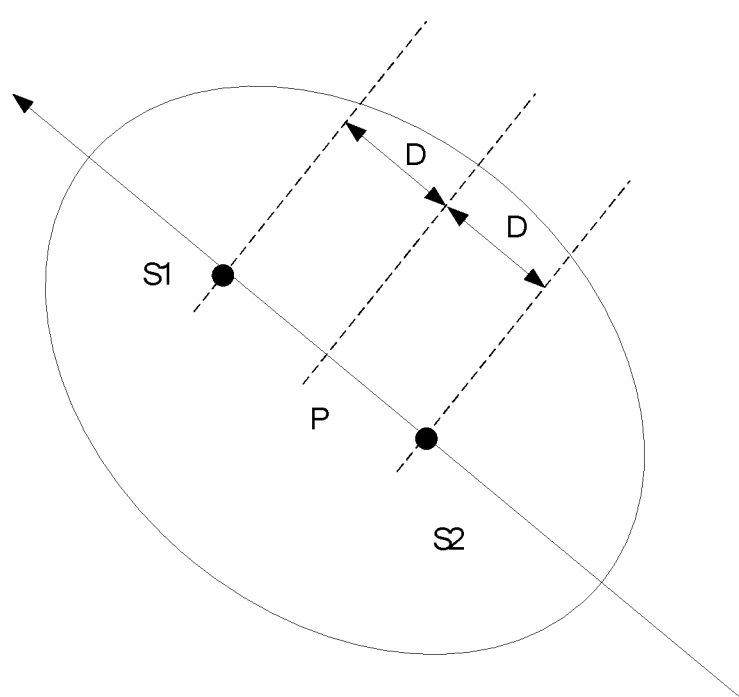
FIG. 4 is a schematic diagram of coordinates of fingerprint imaging under the screen in the present embodiment.

Exemplarily, as shown in FIG. 4, based on the reference point P $(S_{cx}, S_{cy})$ and the direction $\theta_s$ of the reference axis, the two light sources may be turned on in sequence at the screen coordinates $S_1$ and $S_2$ with a distance D from both sides of the reference point along the direction of the reference axis, and the coordinate determination manner may include the following.

The direction $\theta_S$ of the reference axis of the finger in the fingerprint acquisition coordinate system is known, then the slope $k_s = \tan(\theta_s)$ of the fingerprint acquisition coordinate system can be acquired, and further the coordinates of the fingerprint acquisition coordinate system of the two bright spots $S_1$ and $S_2$ are:

$$S_1 = \left(S_{cx} + D/\sqrt{k_s^2+1},\; S_{cy} + k_s D/\sqrt{k_s^2+1}\right);$$

-continued $$S_2 = \left(S_{cx} - D\Big/\sqrt{k_s^2+1},\, S_{cy} - k_s D\Big/\sqrt{k_s^2+1}\right).$$

The determination of the distance D includes the following.

The circle radius of the circular invalid imaging area projected on the contact surface between the finger and the screen is set as R (R is an actual physical size, which may be calculated from the imaged image, a sensor pixel pitch and an object-image magnification relationship), and then the distance between the two bright spots is ensured to be greater than 2R. Usually, in order to acquire a higher signal-to-noise ratio image, the distance between the two spots may be selected as 2R.

Then the distance D: D=R/pitch$_s$ on the screen can be calculated, wherein pitch$_s$ is a pixel pitch on the screen.

In the above embodiment, by the signal matrix of each point touched by the finger, the reference point and the direction of the reference axis of the fingerprint acquisition coordinate system caused by finger pressing are calculated, and the positions of the light sources to be turned on are determined and the images are respectively acquired, which ensures more fingerprint information after the fingerprint images that are acquired twice are superimposed, thereby improving the accuracy of fingerprint recognition.

The present embodiment also provides a system for imaging a fingerprint under a screen, including:

a touch circuit configured to acquire a finger pressing area formed by a finger on the screen;

a calculating unit configured to determine a first light source and a second light source of the screen based on the finger pressing area, wherein arrangement directions of the first light source and the second light source are not perpendicular to a long axis of the finger pressing area;

an image acquiring assembly configured to acquire a first fingerprint image after the first light source is turned on, and a second fingerprint image after the second light source is turned on; and an image processing unit configured to splice the first fingerprint image and the second fingerprint image to acquire a target fingerprint image.

In summary, in the present embodiment, two light sources of which the arrangement direction is not perpendicular to the long axis of the finger pressing area are determined by acquiring the finger pressing area, and based on the finger pressing area. The fingerprint images are respectively acquired after the light sources are turned on in sequence, and the acquired fingerprint images are spliced to acquire the target fingerprint image, which can increase the fingerprint information in the acquired target fingerprint image, thereby further improving the accuracy of fingerprint recognition.

The calculating unit is configured to:

acquire a center point of the finger pressing area and the long axis of the finger pressing area;

acquire a reference point corresponding to the center point of the finger pressing area in a fingerprint acquisition coordinate system, and a reference axis corresponding to the long axis of the finger pressing area in the fingerprint acquisition coordinate system, wherein the fingerprint acquisition coordinate system is a coordinate system where the fingerprint images are located; and determine the first light source and the second light source located on both sides of the reference point on the reference axis.

Optionally, the calculating unit further includes a third calculating module configured to calculate the positions of the first light source and the second light source on both sides of the reference point P on the reference axis.

In summary, in the present embodiment, two light sources of which the arrangement direction is not perpendicular to the long axis of the finger pressing area are determined by acquiring the finger pressing area, and based on the finger pressing area. The fingerprint images are respectively acquired after the light sources are turned on in sequence, and the acquired fingerprint images are spliced to acquire the target fingerprint image, which can increase the fingerprint information in the acquired target fingerprint image, thereby further improving the accuracy of fingerprint recognition. The specific calculation manner refers to the above embodiment.

Optionally, the image acquiring assembly includes an image acquisition circuit. The image acquisition circuit includes sensor units which are arranged in an array, each of the sensor units includes a PIN photodiode and a thin film transistor (TFT) switch, and a cathode of the PIN photodiode in each of sensor units is connected to a drain of the TFT switch.

An anode of each PIN photodiode is connected to a voltage input terminal, and a gate of each row of TFT switches is connected to a gate control signal line. In the sensor units which are arranged in an array, a source of each column of TFT switches is connected to an integrator.

Optionally, the anode of each PIN photodiode is connected to a negative voltage when the image acquisition circuit works.

Figure 5:
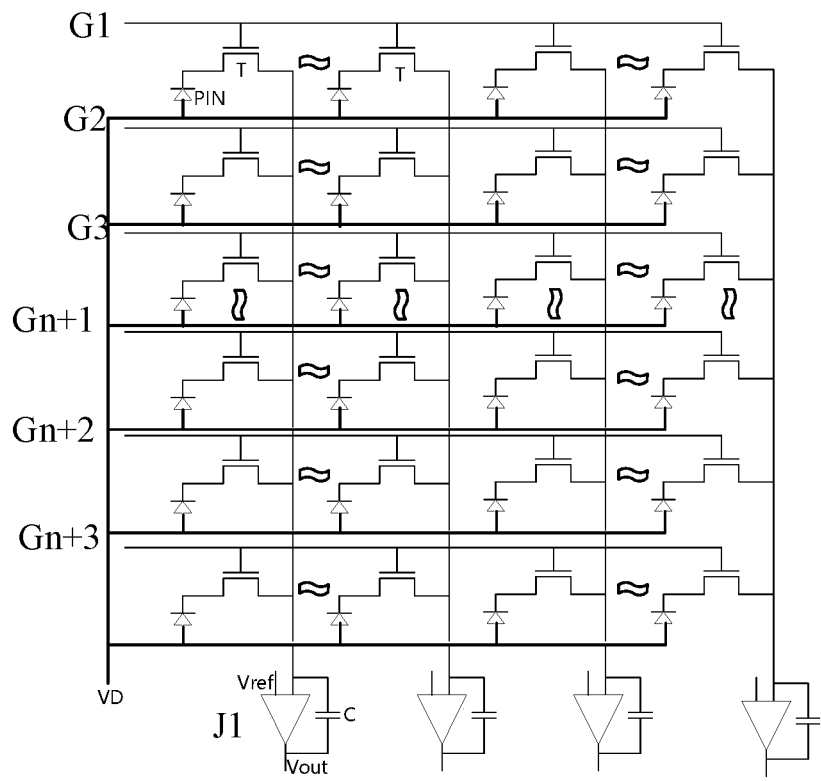
FIG. 5 is a schematic diagram of an image acquisition circuit in the present embodiment.

As shown in FIG. 5, the present embodiment also provides an image acquisition circuit, in which the sensor units are distributed in an array for signal acquisition, and each row is controlled by the same gate control signal. For example, the first row is controlled by G (gate line) 1 signal in the drawing, and so on. Each of the sensor units contains a PIN photodiode and a TFT switch. When fingerprint recognition is performed, the reversal biasing feature of the PIN photodiodes is utilized to connect the anodes of the PIN photodiodes in common and connect to a negative voltage. The PIN photodiodes are enabled to maintain the reversal biasing feature all the time. The gate control signal of each row controls the TFT switches of each row. When the gate control signal is at a high potential, the TFT switches of the same row are turned on, and the TFT switches of the remaining rows are turned off. Then a light-converted electrical signal is transmitted to an integrator J1 by a pixel unit of which the TFT switches are turned on, thereby realizing the reading of one row of data. There is a rolling scan between the rows.

Figure 6:
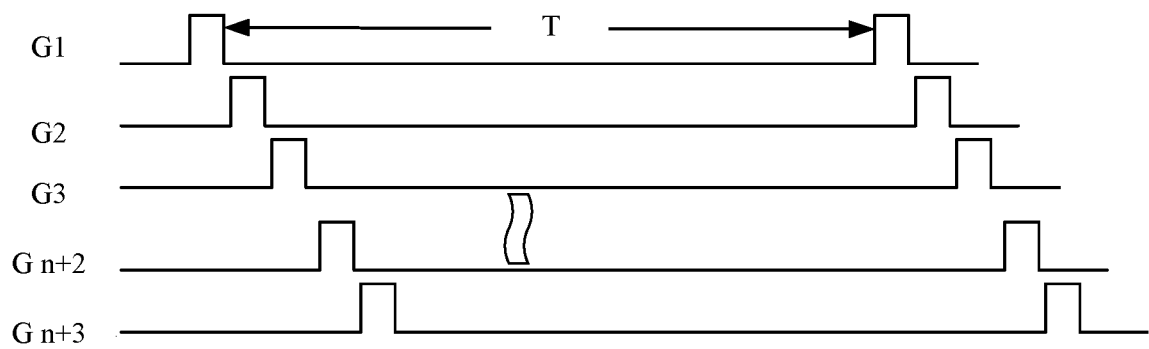
FIG. 6 is a schematic diagram of integration timing of the circuit in FIG. 5.

FIG. 6 shows a timing diagram of an integration scheme, wherein T is integration time, and each row is turned on once within the time of each frame. When the gate control signal of the first row is at a high potential, the first row of data is read. When the gate control signal of the second row is at a high potential, the second row of data is read, and so on until the acquisition of the entire array is finished, which costs the time of one frame. When the TFT switch is turned on, the potential of a drain of the TFT switch is reset to a source of the TFT switch, and the potential of a cathode of the PIN photodiode is reset to a fixed potential, so that the initial state of each frame of data is consistent and the possibility of inconsistency is eliminated.

The foregoing merely describes optional embodiments of the present disclosure and an explanation of the applied technical principles. Those skilled in the art should understand that the scope of the disclosure involved in the present disclosure is not limited to the technical solutions formed by specific combinations of the above technical features, and should also cover other technical solutions formed by any combination of the above technical features and equivalent features thereof without departing from the inventive concept, for example, the technical solutions formed by mutual replacement of the above features and the technical features with similar functions disclosed in (but not limited to) the present disclosure.

In addition, an embodiment of the present disclosure also provides a system for imaging a fingerprint under a screen, including:

a touch circuit configured to acquire a finger pressing area formed by a finger on the screen;

a processor configured to determine a first light source and a second light source of the screen based on the finger pressing area, wherein arrangement directions of the first light source and the second light source are not perpendicular to a long axis of the finger pressing area;

an image acquiring assembly configured to acquire a first fingerprint image after the first light source is turned on, and a second fingerprint image after the second light source is turned on; and the processor splices the first fingerprint image and the second fingerprint image to acquire a target fingerprint image.

Optionally, the processor is configured to:

acquire a center point of the finger pressing area and the long axis of the finger pressing area;

acquire a reference point corresponding to the center point of the finger pressing area in a fingerprint acquisition coordinate system, and a reference axis corresponding to the long axis of the finger pressing area in the fingerprint acquisition coordinate system, wherein the fingerprint acquisition coordinate system is a coordinate system where fingerprint images are located; and determine the first light source and the second light source located on both sides of the reference point on the reference axis.

Optionally, the touch circuit is configured to:

acquire a signal matrix composed of touch points pressed by the finger on the screen, wherein the signal matrix includes information on the finger pressing area.

Optionally, the processor is configured to:

determine a center of gravity of the signal matrix as the center point of the finger pressing area; and determine the long axis of the finger pressing area based on a central moment of the signal matrix.

Optionally, the processor is configured to:

determine the reference point and the reference axis based on a mapping relationship between a touch coordinate system and the fingerprint acquisition coordinate system, as well as the center point of the finger pressing area and the long axis of the finger pressing area, wherein the touch coordinate system is a coordinate system where the finger pressing area is located.

Optionally, the mapping relationship includes:

$$\begin{cases} S_x = A_1 T_x + B_1 T_y + C_1 \\ S_y = A_2 T_x + B_2 T_y + C_2 \end{cases};$$

$$\theta_s = \theta_T - \arctan(B_1/A_1);$$

wherein $S_x$ is a coordinate of an x-axis in the touch coordinate system; $S_y$ is a coordinate of a y-axis in the touch coordinate system; $T_x$ is a coordinate of an x-axis in the fingerprint acquisition coordinate system; $T_y$ is a coordinate of a y-axis in the fingerprint acquisition coordinate system; $A_1$, $B_1$, $C_1$, $A_2$, $B_2$, and $C_2$ are mapping coefficients acquired by calibration; $\theta_T$ is an angle between the long axis of the finger pressing area and the x-axis in the touch coordinate system; and $\theta_S$ is an angle between the reference axis and the x-axis in the fingerprint acquisition coordinate system.

Optionally, a distance between the first light source and the second light source is greater than or equal to 2R, and the R is a radius of a circular invalid imaging area of the light sources of the screen on a contact surface between the finger and the screen.

Optionally, the image acquiring assembly includes an image acquisition circuit, the image acquisition circuit includes sensor units which are arranged in rows and columns, each of the sensor units includes a PIN photodiode and a TFT, a cathode of the PIN photodiode in each of the sensor units is electrically connected to a drain of the TFT; and an anode of the PIN photodiode is electrically connected to a voltage input terminal, a gate of the TFT in each row of the sensor units is electrically connected to a gate control signal line, and a source of the TFT in each column of the sensor units is electrically connected to an integrator.

Optionally, the anode of the PIN photodiode is connected to a negative voltage when the image acquisition circuit works.

In one aspect, a method for imaging a fingerprint under a screen is provided, and includes the steps: acquiring a signal matrix of each touch point pressed by the finger on the screen;

calculating a center point P and a long axis direction $\theta_s$ of a screen acquisition image based on the signal matrix;

calculating the positions of a first light source and a second light source on both sides of the center point P on a long axis of the screen acquisition image;

acquiring a first screen acquisition image after the first light source is turned on, and a second screen acquisition image after the second light source is turned on; and splicing the first screen acquisition image and the second screen acquisition image to acquire a finger pressing fingerprint image.

Optionally, determining a center point P and a long axis direction of a screen acquisition image specifically includes: determining a center point P' and a long axis direction $\theta_T$ of the finger pressing image based on the signal matrix; and determining the center point P and the long axis direction $\theta_s$ of the screen acquisition image based on the center point P' and the long axis direction $\theta_T$ of the finger pressing image.

Optionally, determining a center point P' and a long axis direction $\theta_T$ of the finger pressing image based on the signal matrix specifically includes: calculating the center of gravity of the signal matrix, the center of gravity being the center point P'; and calculating the long axis direction based on a central moment of the signal matrix.

Optionally, determining the center point P and the long axis direction $\theta_s$ of the screen acquisition image based on the center point P' and the long axis direction $\theta_T$ of the finger pressing image specifically includes: determining the center point P and the long axis direction $\theta_s$ of the screen acquisition image by a coordinate mapping relationship between a touch screen and a display screen.

Optionally, a distance between the first light source and the second light source is not less than 2R, R is the length of a projection of a circle radius of a middle invalid imaging area of a point light source on a contact surface between the finger and the screen.

In the other aspect, a system for imaging a fingerprint under a screen is provided and includes: a touch unit configured to acquire a signal matrix of each touch point pressed by the finger on the screen;

a calculating unit configured to calculate a center point P and a long axis direction s of a screen acquisition image based on the signal matrix; and calculate the positions of a first light source and a second light source on both sides of the center point P on a long axis of the screen acquisition image;

an image acquiring unit configured to acquire a first screen acquisition image after the first light source is turned on, and a second screen acquisition image after the second light source is turned on; and an image processing unit configured to splice the first screen acquisition image and the second screen acquisition image to acquire a finger pressing fingerprint image.

Optionally, the calculating unit includes a first calculating module configured to determine a center point P' and a long axis direction $\theta_T$ of the finger pressing image based on the signal matrix; and a second calculating module configured to determine the center point P and the long axis direction $\theta_s$ of the screen acquisition image based on a coordinate relationship between a touch layer and a display layer.

Optionally, the calculating unit further includes a third calculating module configured to calculate the positions of the first light source and the second light source on both sides of the center point P on a long axis of the screen acquisition image.

Optionally, the image acquiring unit includes an image acquisition circuit, wherein the image acquisition circuit includes sensor units which are distributed in an array, each of the sensor units includes a PIN photodiode and a TFT switch, and a cathode of the PIN photodiode in each of the sensor units is connected to a drain of the TFT switch; and an anode of each PIN photodiode is connected to a voltage input terminal, a gate of each row of TFT switches is connected to a gate control signal line, and a source of each column of TFT switches is connected to an integrator.

Optionally, the anode of each PIN photodiode is connected to a negative voltage when the image acquisition circuit works.

What is claimed is:

1. A method for imaging a fingerprint under a screen, comprising:

acquiring a finger pressing area formed by a finger pressing on the screen;

determining a reference point corresponding to a center point of the finger pressing area in a fingerprint acquisition coordinate system, a reference axis corresponding to a long axis of the finger pressing area in the fingerprint acquisition coordinate system, as well as a mapping relationship between a touch coordinate system and the fingerprint acquisition coordinate system, wherein the fingerprint acquisition coordinate system is a coordinate system where fingerprint images are located, the touch coordinate system is a coordinate system where the finger pressing area is located, and the mapping relationship comprises:

$$\begin{cases} S_x = A_1 T_x + B_1 T_y + C_1 \\ S_y = A_2 T_x + B_2 T_y + C_2 \end{cases},$$

wherein $S_x$ is a coordinate of an x-axis in the touch coordinate system; $S_y$ is a coordinate of a y-axis in the touch coordinate system; $T_x$ is a coordinate of an x-axis in the fingerprint acquisition coordinate system; $T_y$ is a coordinate of a y-axis in the fingerprint acquisition coordinate system; and $A_1$, $B_1$, $C_1$, $A_2$, $B_2$, and $C_2$ are mapping coefficients acquired by calibration;

determining a first light source and a second light source of the screen based on the reference point and the reference axis, wherein arrangement directions of the first light source and the second light source are not perpendicular to a long axis of the finger pressing area;

acquiring a first fingerprint image after the first light source is turned on, and a second fingerprint image after the second light source is turned on; and splicing the first fingerprint image and the second fingerprint image to acquire a target fingerprint image.

2. The method for imaging the fingerprint under the screen according to claim 1, wherein said determining the first light source and the second light source of the screen based on the reference point and the reference axis comprises:

determining the first light source and the second light source located on both sides of the reference point on the reference axis.

3. The method for imaging the fingerprint under the screen according to claim 1, wherein the mapping relationship comprises:

$\theta_s = \theta_T - \arctan(B_1/A_1)$ wherein $\theta_T$ is an angle between the long axis of the finger pressing area and the x-axis in the touch coordinate system; and $\theta_S$ is an angle between the reference axis and the x-axis in the fingerprint acquisition coordinate system.

4. The method for imaging the fingerprint under the screen according to claim 1, wherein a distance between the first light source and the second light source is greater than or equal to 2R, and the R is a radius of a circular invalid imaging area of the light sources of the screen on a contact surface between the finger and the screen.

5. The method for imaging the fingerprint under the screen according to claim 1, wherein said determining a reference point corresponding to a center point of the finger pressing area in a fingerprint acquisition coordinate system, a reference axis corresponding to a long axis of the finger pressing area in the fingerprint acquisition coordinate system, as well as a mapping relationship between a touch coordinate system and the fingerprint acquisition coordinate system, and said determining the first light source and the second light source of the screen based on the reference point and the reference axis comprise:

acquiring the center point of the finger pressing area and the long axis of the finger pressing area; and determining the first light source and the second light source located on both sides of the reference point on the reference axis, wherein the distance between the first light source and the second light source is greater than or equal to 2R, and the R is the radius of the circular invalid imaging area of the light sources of the screen on the contact surface of the finger and the screen.

6. The method for imaging the fingerprint under the screen according to claim 1, further comprising:
acquiring the center point of the finger pressing area and the long axis of the finger pressing area.

7. The method for imaging the fingerprint under the screen according to claim 6, wherein said acquiring the finger pressing area formed by the finger pressing on the screen comprises:
acquiring a signal matrix composed of touch points pressed by the finger on the screen, wherein the signal matrix comprises information on the finger pressing area.

8. The method for imaging the fingerprint under the screen according to claim 7, wherein said acquiring the center point of the finger pressing area and the long axis of the finger pressing area comprises:
determining a center of gravity of the signal matrix as the center point of the finger pressing area; and
determining the long axis of the finger pressing area based on a central moment of the signal matrix.

9. The method for imaging the fingerprint under the screen according to claim 8, wherein said determining the long axis of the finger pressing area based on the central moment of the signal matrix comprises:
determining the long axis of the finger pressing area based on a second-order central moment of the signal matrix.

10. A system for imaging a fingerprint under a screen, comprising:
a touch circuit configured to acquire a finger pressing area formed by a finger pressing on the screen;
a processor configured to determine a reference point corresponding to a center point of the finger pressing area in a fingerprint acquisition coordinate system, a reference axis corresponding to a long axis of the finger pressing area in the fingerprint acquisition coordinate system, as well as a mapping relationship between a touch coordinate system and the fingerprint acquisition coordinate system, wherein the fingerprint acquisition coordinate system is a coordinate system where fingerprint images are located, the touch coordinate system is a coordinate system where the finger pressing area is located, and the mapping relationship comprises:

$$\begin{cases} S_x = A_1 T_x + B_1 T_y + C_1 \\ S_y = A_2 T_x + B_2 T_y + C_2 \end{cases}$$

wherein $S_x$ is a coordinate of an x-axis in the touch coordinate system; $S_y$ is a coordinate of a y-axis in the touch coordinate system; $T_x$ is a coordinate of an x-axis in the fingerprint acquisition coordinate system; $T_y$ is a coordinate of a y-axis in the fingerprint acquisition coordinate system; and $A_1$, $B_1$, $C_1$, $A_2$, $B_2$, and $C_2$ are mapping coefficients acquired by calibration; and determine a first light source and a second light source of the screen based on the reference point and the reference axis, wherein arrangement directions of the first light source and the second light source are not perpendicular to a long axis of the finger pressing area; and
an image acquiring assembly configured to acquire a first fingerprint image after the first light source is turned on, and a second fingerprint image after the second light source is turned on; and
wherein the processor splices the first fingerprint image and the second fingerprint image to acquire a target fingerprint image.

11. The system for imaging the fingerprint under the screen according to claim 10, wherein the processor is configured to:
acquire the center point of the finger pressing area and the long axis of the finger pressing area;
acquire the reference point corresponding to the center point of the finger pressing area in the fingerprint acquisition coordinate system, and the reference axis corresponding to the long axis of the finger pressing area in the fingerprint acquisition coordinate system; and
determine the first light source and the second light source located on both sides of the reference point on the reference axis.

12. The system for imaging the fingerprint under the screen according to claim 11, wherein the touch circuit is configured to:
acquire a signal matrix composed of touch points pressed by the finger on the screen, wherein the signal matrix comprises information on the finger pressing area.

13. The system for imaging the fingerprint under the screen according to claim 12, wherein the processor is configured to:
determine a center of gravity of the signal matrix as the center point of the finger pressing area; and
determine the long axis of the finger pressing area based on a central moment of the signal matrix.

14. The system for imaging the fingerprint under the screen according to claim 11, wherein a distance between the first light source and the second light source is greater than or equal to 2R, and the R is a radius of a circular invalid imaging area of the light sources of the screen on a contact surface between the finger and the screen.

15. The system for imaging the fingerprint under the screen according to claim 10, wherein the image acquiring assembly comprises an image acquisition circuit, the image acquisition circuit comprises sensor units which are arranged in rows and columns, each of the sensor units comprises a PIN photodiode and a TFT, a cathode of the PIN photodiode in each of the sensors unit is electrically connected to a drain of the TFT; and
an anode of the PIN photodiode is electrically connected to a voltage input terminal, a gate of the TFT in each row of the sensor units is electrically connected to a gate control signal line, and a source of the TFT in each column of the sensor units is electrically connected to an integrator.

16. The system for imaging the fingerprint under the screen according to claim 15, wherein the anode of each PIN photodiode is connected to a negative voltage when the image acquisition circuit works.

17. The system for imaging the fingerprint under the screen according to claim 10, wherein the processor is configured to:
acquire the center point of the finger pressing area and the long axis of the finger pressing area; and
determine the first light source and the second light source located on both sides of the reference point on the reference axis, wherein the distance between the first light source and the second light source is greater than or equal to 2R, and the R is the radius of the circular invalid imaging area of the light sources of the screen on the contact surface of the finger and the screen.

18. A screen, comprising a system for imaging a fingerprint under the screen, wherein the system for imaging the fingerprint under the screen comprises:
  a touch circuit configured to acquire a finger pressing area formed by a finger pressing on the screen;
  a processor configured to determine a reference point corresponding to a center point of the finger pressing area in a fingerprint acquisition coordinate system, a reference axis corresponding to a long axis of the finger pressing area in the fingerprint acquisition coordinate system, as well as a mapping relationship between a touch coordinate system and the fingerprint acquisition coordinate system, wherein the fingerprint acquisition coordinate system is a coordinate system where fingerprint images are located, the touch coordinate system is a coordinate system where the finger pressing area is located, and the mapping relationship comprises:

$$\begin{cases} S_x = A_1 T_x + B_1 T_y + C_1 \\ S_y = A_2 T_x + B_2 T_y + C_2 \end{cases},$$

wherein $S_x$ is a coordinate of an x-axis in the touch coordinate system; $S_y$ is a coordinate of a y-axis in the touch coordinate system: $T_x$ is a coordinate of an x-axis in the fingerprint acquisition coordinate system: $T_y$ is a coordinate of a y-axis in the fingerprint acquisition coordinate system; and $A_1$, $B_1$, $C_1$, $A_2$, $B_2$, and $C_2$ are mapping coefficients acquired by calibration; and determine a first light source and a second light source of the screen based on the reference point and the reference axis, wherein arrangement directions of the first light source and the second light source are not perpendicular to a long axis of the finger pressing area; and
  an image acquisition circuit configured to acquire a first fingerprint image after the first light source is turned on, and a second fingerprint image after the second light source is turned on; and
  wherein the processor splices the first fingerprint image and the second fingerprint image to acquire a target fingerprint image.

* * * * *